United States Patent Office 3,102,068
Patented Aug. 27, 1963

3,102,068
METHOD OF CONTROLLING BACTERIAL DISEASES OF FRUIT TREES
Nathan E. Tolbert, Okemos, Mich., assignor to Michigan State University of Agriculture and Applied Science, a Michigan nonprofit corporation
No Drawing. Filed Oct. 10, 1961, Ser. No. 144,073
7 Claims. (Cl. 167—22)

The present invention relates to a method of controlling bacteria-caused diseases of fruit trees. More particularly, the invention relates to the control of fire blight and bacterial spot of fruit trees by the employment of certain substituted amides and esters of haloacetic acids.

Bacterial diseases of fruit trees have long been a vexing problem to orchardists and have resulted in confining certain fruit industries to geographical regions where the severity of the diseases is tempered by environmental conditions. Particularly important commercially are fire blight of pears and apples and bacterial spot of peaches and prunes.

The fire blight disease of pomaceous fruits is caused by the bacterium *Erwinia amylovora* (Burrill). The disease is the most destructive disease of the pear and also severely attacks a large number of apple varieties. The limited growth of the pear industry during this century has been largely attributed to the existence of fire blight, which has restricted the geographical areas suitable for pear and apple industries to those providing natural environments, viz. cool and dry climates, that mitigate the severity of the disease. Thus, the apple and pear industries are centered in the northern parts of the United States, particularly in New York and in Michigan. However, even in these locations, fire blight is an extremely serious problem in damaging fruit trees. Despite the commercial importance of the disease, however, attempts to arrest fire blight have met either with almost complete failure, or, at best, limited success. Growers have resorted to periodic applications of surface protectants, such as Bordeaux mixture, to the trees but any disease mitigating effects are of very short duration, subject to temperature variation, and require frequent, cumbersome applications. More recently, the use of antibiotics such as agrimycin and streptomycin has been suggested. While these compounds have exhibited significant activity against fire blight, the complexity of structure and the very large expense involved in preparing such compounds have made large-scale commercial application unfeasible.

Problems similar to those encountered in combating fire blight have also been found in attempting to arrest bacterial spot of peaches and prunes, caused by the bacterium *Xanthomonas pruni*. A satisfactory method of control of the bacterial spot disease is recognized as one of the most urgent needs of the peach industry.

It has now been found that certain substituted amides and substituted esters of haloacetic acids effectively control fire blight and bacetrial spot. The compounds contemplated for use in this invention are relatively easy to prepare and many of them have the further advantage of being water-soluble, thereby providing simple formulations.

The compounds used in this invention comprise substituted amides and substituted esters of bromoacetic acid and iodoacetic acid.

The term "substituted amides" as used generically throughout this specification is meant to refer to compounds of the general formula (I) 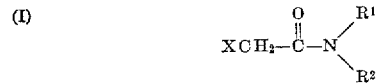

wherein X is selected from the group consisting of bromine and iodine; $R^1$ individually is selected from the group consisting of hydrogen and alkyl of from 1 to about 4 carbon atoms; $R^2$ individually is selected from the group consisting of carboxamido substituted alkyl radicals, cyano substituted alkyl radicals, and carboxy substituted alkyl radicals, preferably where the carboxamido, cyano, and carboxy groups are attached to the carbon atom adjacent to the nitrogen atom of said amides, and where said alkyl radicals may further be substituted with, for example, such groups as halogen, alkoxy, thioalkyl, aryl, and aralkyl; and $R^1$ and $R^2$ taken together with the nitrogen atom to which they are attached represent a heterocyclic ring of from 2 to 6 carbon atoms, said ring being substituted on at least one of the carbon atoms adjacent to said nitrogen atom with a member of the group consisting of carboxamido, cyano, and carboxy.

The term "substituted esters" as used generically herein is meant to refer to compounds of the general formula (II) 

wherein X is defined as above and $R^3$ is selected from the group consisting of carboxamido substituted alkyl radicals, cyano substituted alkyl radicals, and carboxy substituted alkyl radicals, preferably where the carboxamido, cyano, and carboxy groups are attached to the carbon atom adjacent to the ester oxygen atom and where said alkyl radicals may further be substituted with, for example, such groups as halogen, alkoxy, thioalkyl, aryl, and aralkyl.

Particularly preferred for use in this invention, due to their high degree of effectiveness against bacterial fruit tree diseases, are compounds of the general formulae:

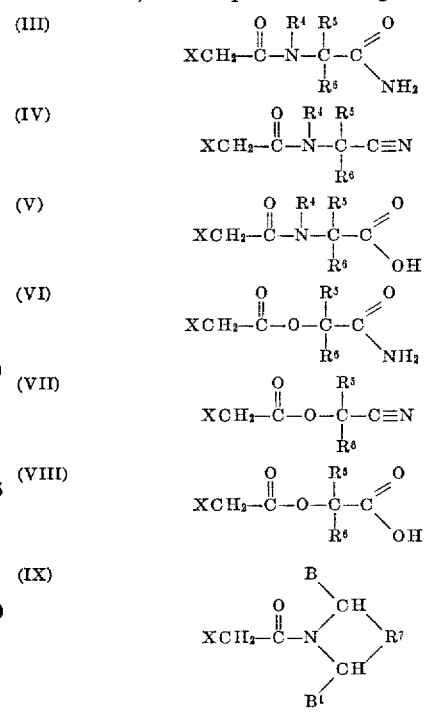

where X is defined as above; $R^4$ and $R^5$ individually are selected from the group consisting of hydrogen and alkyl of from 1 to 4 carbon atoms; $R^6$ is selected from the group consisting of alkyl of from 1 to about 8 carbon atoms, preferably from 2 to about 5 carbon atoms, alkylthioalkyl of from 2 to about 5 carbon atoms; aryl, preferably phenyl; and aralkyl of from 7 to about 13 carbon atoms, preferably benzyl; $R^7$ can represent a single bond or an alkylene radical of from 2 to about 6 carbon atoms such as ethylene, propylene, trimethylene, and tetramethylene; B is selected from the group consisting of carboxamido, cyano, and carboxy, and B' is selected from the group consisting of hydrogen, carboxamido, cyano, and carboxy.

It can be seen that the compounds used in this invention are amides and esters of bromoacetic acid and iodoacetic acid characterized by having a carboxamido, cyano, or carboxy substituent in the amide or ester moiety of the molecule, and preferably where said substituent is attached to the carbon atom adjacent to the amide nitrogen or ester oxygen of said moiety. In the case of the cyclic compounds represented by general Formula IX above, there are two carbon atoms adjacent to the amide nitrogen and both of these carbon atoms can be substituted with said substituents.

As illustrative of the compounds coming under general Formula III above, there can be mentioned 2-(α-bromoacetamido)butyramide, 2-(α-bromoacetamido)acetamide, 2-(α-bromoacetamido)propionamide, 2-(α-bromoacetamido)pentanoamide, 2-(α-bromoacetamido)-3-methylbutyramide, 2-(α-bromoacetamido)-5-methylpentanoamide, 2-(α-bromoacetamido)hexanoamide, 2-(α-bromoacetamido)heptanoamide, 2-(α-bromoacetamido)-4-methylpentanoamide, 2-(α-bromoacetamido) - 2 - methylbutyramide, 2-(α - bromoacetamido) - 4 - methylthiobutyramide, 2-(α-bromoacetamido)-4-methoxybutyramide, 2-(α-bromoacetamido)-4-chlorobutyramide, 2-(α - bromoacetamido) - 3-bromobutyramide, 2 - (α - bromoacetamido)-2-phenylacetamide, 2-(α-bromoacetamido)-3-phenylpropionamide, 2-(N-methyl-α-bromoacetamido)butyramide, 2-(N-ethyl-α-bromoacetamido)-3-methylbutyramide, 2-(N-isopropyl-α-bromoacetamido)pentanoamide, 2-(N-butyl-α-bromoacetamido)acetamide, and the like, and the corresponding iodoacetamido compounds.

Illustrative of the compounds coming under general Formula IV, above, are 2-(α-bromoacetamido)butyronitrile, 2-(α-bromoacetamido)acetonitrile, 2-(α-bromoacetamido)propionitrile, 2 - (α - bromoacetamido)pentanonitrile, 2-(α-bromoacetamido)-3-methylbutyronitrile, 2-(α-bromoacetamido)-4-methylpentanonitrile, 2(α-bromoacetamido)hexanonitrile, 2 - (α - bromoacetamido)heptanonitrile, 2-(α-bromoacetamido)-4-methoxypentanonitrile, 2-(α-bromoacetamido)-2-methylbutyronitrile, 2-(α-bromoacetamido)-4-methylthiobutyronitrile, 2-(α-bromoacetamido)-4-ethoxybutyronitrile, 2 - (α - bromoacetamido)-4-chlorobutyronitrile, 2-(α-bromoacetamido)-3-bromobutyronitrile, 2-(α-bromoacetamido)-2-phenylacetonitrile, 2-(α-bromoacetamido)-3-phenylpropionitrile, 2-(N-methyl-α-bromoacetamido)butyronitrile, 2-(N-ethyl-α-bromoacetamido)-3-methylbutyronitrile, 2-(N-isopropyl-α-bromoacetamido)pentanonitrile, 2-(N-butyl-α-bromoacetamido)acetonitrile, and the like, and the corresponding iodoacetamido compounds.

Illustrative of the compounds responding to general Formula V, above, are 2-(α-bromoacetamido)butyric acid, 2-(α-bromoacetamido)acetic acid, 2-(α-bromoacetamido)propionic acid, 2-(α-bromoacetamido)pentanoic acid, 2-(α-bromoacetamido)-3-methylbutyric acid, 2-(α-bromoacetamido)-4-methylpentanoic acid, 2-(α-bromoacetamido)hexanoic acid, 2-(α-bromoacetamido)heptanoic acid, 2-(α-bromoacetamido)-3-methylpentanoic acid, 2-(α-bromoacetamido)-2-methylbutyric acid, 2-(α-bromoacetamido)-4-methylthiobutyric acid, 2-(α-bromoacetamido)-4-methoxybutyric acid, 2-(α-bromoacetamido)-4-chlorobutyric acid, 2-(α-bromoacetamido)-3-bromobutyric acid, 2-(α-bromoacetamido)-2-phenylacetic acid, 2-(α-bromoacetamido)-3-phenylpropionic acid, 2-(N-methyl-α-bromoacetamido)butyric acid, 2-(N-ethyl-α-bromoacetamido)-3-methylbutyric acid, 2-(N-isopropyl-α-bromoacetamido)pentanoic acid, 2-(N-butyl-α-bromoacetamido)acetic acid, and the like, and the corresponding iodoacetamido compounds.

Exemplary of the compounds coming under general Formula VI above, are 2-(α-bromoacetoxy)butyramide, 2-(α-bromoacetoxy)acetamide, 2-(α-bromoacetoxy)propionamide, 2-(α-bromoacetoxy)pentanoamide, 2-(α-bromoacetoxy)-3-methylbutyramide, 2-(α-bromoacetoxy)-4-methylpentanoamide, 2-(α-bromoacetoxy)hexanoamide, 2-(α-bromoacetoxy)heptanoamide, 2-(α-bromoacetoxy)-4-methylthiobutyramide, 2-(α-bromoacetoxy)-4-methoxybutyramide, 2-(α-bromoacetoxy)-4-chlorobutyramide, 2-(α-bromoacetoxy)-3-bromobutyramide, 2-(α-bromoacetoxy)-2-methylbutyramide, 2-(α-bromoacetoxy)-2-phenylbutyramide, 2-(α-bromoacetoxy)-3-phenylbutyramide, 2-(α-bromoacetoxy)-3-phenylpropionamide, and the like, and the corresponding iodoacetamido compounds.

Illustrative of the compounds responding to general Formula VII, above, are 2-(α-bromoacetoxy)butyronitrile, 2-(α-bromoacetoxy)acetonitrile, 2-(α-bromoacetoxy)propionitrile, 2-(α-bromoacetoxy)pentanonitrile, 2-(α-bromoacetoxy)-3-methylbutyronitrile, 2-(α-bromoacetoxy) - 4-methylpentanonitrile, 2-(α-bromoacetoxy)hexanonitrile, 2-(α-bromoacetoxy)heptanonitrile, 2-(α-bromoacetoxy)-4-methylthiobutyronitrile, 2-(α-bromoacetoxy) - 4 - methoxybutyronitrile, 2-(α-bromoacetoxy)-4-chlorobutyronitrile, 2-(α-bromoacetoxy)-3-bromobutyronitrile, 2-(α-bromoacetoxy)-2-methylbutyronitrile, 2-(α-bromoacetoxy)-2-phenylacetonitrile, 2-(α-bromoacetoxy)-3-phenylpropionitrile, and the like, and the corresponding iodoacetamido compounds.

Exemplary of the compounds coming under general Formula VIII, above, are 2-(α-bromoacetoxy)butyric acid, 2-(α-bromoacetoxy)acetic acid, 2-(α-bromoacetoxy)propionic acid, 2-(α-bromoacetoxy)pentanoic acid, 2-(α-bromoacetoxy)-3-methylbutyric acid, 2 - (α - bromoacetoxy)-4-methylpentanoic acid, 2-(α-bromoacetoxy)hexanoic acid, 2-(α-bromoacetoxy)heptanoic acid, 2-(α-bromoacetoxy)-4-methylthiobutyric acid, 2-(α-bromoacetoxy)-4-methoxybutyric acid, 2-(α-bromoacetoxy)-4-chlorobutyric acid, 2-(α-bromoacetoxy)-3-bromobutyric acid, 2-(α-bromoacetoxy)-2-methylbutyric acid, 2 - (α - bromoacetoxy)-2-phenylacetic acid, 2-(α-bromoacetoxy)-3-phenylpropionic acid, and the like, and the corresponding iodoacetamido compounds.

Illustrative of the compounds coming under general Formula IX, above, are N-bromoacetyl-2,6-dicyanopiperidine, N-bromoacetyl-2,6-dicarboxamidopiperidine, N-bromoacetyl-2,6-dicarboxypiperidine, N-bromoacetyl-2-cyanopiperidine, N-bromoacetyl-2-carboxypiperidine, N-bromoacetyl-2-carboxamidopiperidine, N-bromoacetyl - carboxyamidopyrrolidine, N-bromoacetyl-2,5-dicyanopyrrolidine, N-bromoacetyl-2-cyanopropyleneimide, N-bromoacetyl-2,4-dicarboxamidopropyleneimide, N-bromoacetyl-2-cyanoethyleneimide, N-bromoacetyl-2,3-dicarboxamidoethyleneimide, and the like, and the corresponding iodoacetyl compounds.

The compounds used in this invention can be generally prepared by reacting bromoacetyl chloride or iodoacetyl chloride with suitably substituted amino or hydroxy amides, nitriles, or acids. The following reaction schemes will illustrate a general preparative procedure.

For the compounds of general Formula III above, suitably substituted α-amino amides are reacted with bromo- or iodoacetyl chloride.

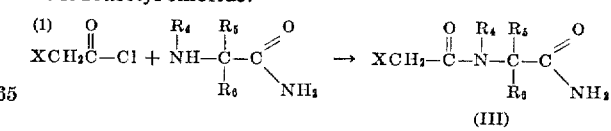

For the compounds of general Formula VII, above, suitably substituted α-hydroxy nitriles are reacted with bromo- or iodoacetyl chloride.

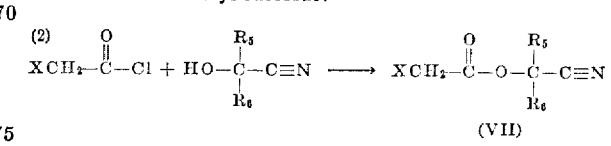

For the compounds of general Formula IX, above, suitable mono- or di-carboxamido, cyano, or carboxy substituted N-containing heterocycles are reacted with bromo or iodoacetyl chloride.

(3)
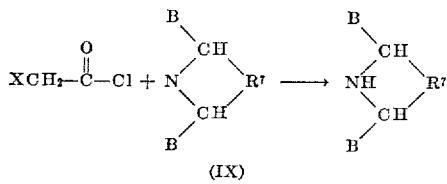
(IX)

In the general preparative procedure, the reaction is conveniently carried out in an inert liquid medium and in the presence of a base at temperatures of from about $-50°$ C. to about $150°$ C.

The inert liquid media utilizable in the reaction comprise water and inert organic vehicles in which the reactants are soluble and which are inert to the reactants, i.e. do not contain reactive groups such as amino or hydroxyl groups. Illustrative inert organic vehicles are benzene, toluene, xylene, chloroform, ethylene dichloride, carbon tetrachloride, chlorobenzene, methyl ethyl ether, ethyl acetate, and the like. A two-phase medium comprised of water and an inert organic vehicle immiscible therewith in sometimes advantageously employed. When using such two-phase media, the preferred reaction temperature is between about $0°$ C. and about $60°$ C.

Bases suitable for use in the reaction comprise the inorganic bases, such as sodium hydroxide, potassium hydroxide, magnesium hydroxide, barium hydroxide, aluminum hydroxide, zinc hydroxide, and the like, as well as inert organic bases such as the pyridines, N,N-dialkyl anilines, trialkylamines, quinolines, and the like. If an amino amide reagent employed is in the form of its hydrochloride salt, sufficient base should be employed to neutralize the acid salt as well as to take up the hydrogen chloride evolved in the reaction.

While equimolar proportions of reactants are preferably employed, some excess of either reagent can be used.

The compounds used in this invention may also be prepared by first synthesizing the substituted amides and esters of chloroacetic acid, in a manner analogous to the above-described general preparative procedure, and reacting the resulting compound with sodium bromide or sodium iodide to give the desired compounds.

The following examples are illustrative:

EXAMPLE I

*Preparation of 2-(α-Bromoacetamido)-3-Methylbutyramide*

Following the general procedure, a solution of 100 grams (0.64 mole) of bromoacetyl chloride dissolved in 100 milliliters of chloroform was added to a cooled mixture of 110 grams (0.69 mole) of 96 percent pure 2-amino-3-methylbutyramide hydrochloride and 70 grams (1.75 moles) of sodium hydroxide in 350 milliliters of water. The addition was completed in 15 minutes, with stirring, and the reaction mixture was stirred for an additional 30 minutes at $5°$ C. The resulting solids were collected by filtration and the filter cake washed well with chloroform and water. After drying, 121 grams of colorless product, correponsding to a yield of 80 percent of the theoretical, were obtained. This product has a melting point of $162-166°$ C. and was purified by recrystallization from ethanol. The purified product had a melting point of $166-167°$ C. and analyzed as follows:

| | C | H | Br |
|---|---|---|---|
| Calculated | 35.46 | 5.52 | 33.71 |
| Found | 36.76 | 6.04 | 33.58 |

EXAMPLE II

*Preparation of 2-(α-Iodoacetamido)-3-Methylbutyramide*

A solution of 19.2 grams of 2-(α-chloroacetamido)-3-methylbutyramide (.1 mole) and 16 grams of sodium iodide in 200 milliliters of acetone was heated to reflux, with stirring, and maintained at the reflux temperature for about 30 minutes. The resulting mixture was cooled to $15°$ C. and filtered. The filter cake was washed with cold acetone and dried to give 35 grams of small white crystals. These crystals were slurried in water and the resulting slurry filtered. The filter cake was washed with water and dried to give 23 grams of white crystals having a melting point of $182-183°$ C. These product crystals corresponded to a yield of 82 percent of the theoretical and analyzed as follows:

| | C | H | N |
|---|---|---|---|
| Calculated | 29.90 | 5.02 | 9.86 |
| Found | 30.24 | 4.96 | 9.77 |

EXAMPLE III

*Preparation of 2-(α-Bromoacetamido)Pentanoamide*

To a cooled solution of 90 grams of potassium carbonate in 250 milliliters of water were added 33.4 grams of 2-amino-pentanoamide hydrochloride (0.2 mole) in 160 milliliters of cyclohexane at $10°$ C. To the resulting mixture was added a solution of 32 grams of bromoacetyl chloride in 160 milliliters of cyclohexane over a period of 10 minutes, while keeping the reaction temperature between 10 and $15°$ C. The resulting reaction product mixture was stirred for 30 minutes, filtered, and the filter cake washed with cyclohexane and then with water. The filter cake was dried to give 18 grams of small white product crystals having a melting point of $103-107°$ C.

EXAMPLE IV

*Preparation of 2-(α-Bromoacetamido)-4-Methylpentanoamide*

To a cooled solution of 45 grams of potassium carbonate in 120 milliliters of water and 80 milliliters of chloroform were added 16.7 grams of 2-amino-4-methylpentanoamide hydrochloride at $10°$ C. To the resulting solution was slowly added a solution of 23.6 grams of bromoacetyl chloride in 80 milliliters of chloroform at $10°$ C., with vigorous stirring, over a period of 15 minutes. The resulting mixture was stirred for an additional 30 minutes and the resulting solids filtered off. The filter cake was washed well with water and dried to give 27 grams of small white product crystals having a melting point of $154-164°$ C. The product analyzed as follows:

| | C | H | N |
|---|---|---|---|
| Calculated | 38.26 | 6.02 | 11.16 |
| Found | 38.51 | 6.07 | 11.33 |

EXAMPLE V

*Preparation of 2-(α-Bromoacetamido) Butyramide*

To a cooled solution of 45 grams of potassium carbonate in 120 milliliters of water and 80 milliliters of chloroform were added 14 grams of 2-aminobutyramide hydrochloride at $10°$ C. To the resulting solution were slowly added 23.6 grams of bromoacetyl chloride in 80 milliliters of chloroform at $10-15°$ C., with vigorous stirring, over a period of 15 minutes. The resulting reaction mixture was stirred for an additional 30 minutes and filtered. The filter cake was washed well with water and dried to give 24 grams of small white product crystals having a melting point of $121-124°$ C. This product was recrystallized from ethyl acetate to give 12 grams of glistening white needles having a melting point of 127–130° C. These purified product needles analyzed as follows:

|  | C | H | N |
|---|---|---|---|
| Calculated | 32.33 | 4.97 | 12.56 |
| Found | 34.03 | 5.49 | 13.31 |

EXAMPLE VI

*Preparation of 2-(α-Bromacetamido)-4-Methylmercaptobutyramide*

To a cooled solution of 63 grams of sodium hydroxide in 350 milliliters of water and 250 milliliters of chloroform were added 131 grams of 94 percent pure methioninamide hydrochloride, with stirring, at 10–15° C. To the resulting solution were added dropwise 104 grams of bromoacetyl chloride over a period of 15 minutes, while maintaining the reaction temperature below 50° C. The reaction mixture was stirred for an additional 30 minutes and filtered. The resulting filter cake was washed with water and dried to give 146 grams of brown solids. These solids were recrystallized from hot isopropanol to give 112 grams of light brown needles of melting point 115–118° C. These needles were again recrystallized from hot isopropanol to give light tan product needles having a melting point of 122–123° C.

EXAMPLE VII

*Preparation of 2-(α-Bromoacetamido)-2-phenylacetamide*

To a cooled solution of 45 grams of potassium carbonate in 120 milliliters of water and 80 milliliters chloroform were added 187 grams of phenylglycinamide hydrochloride (0.1 mole) at 10° C. To the resulting solution were added 23.6 grams of bromoacetyl chloride in 80 milliliters of chloroform at 10–15° C., with stirring, over a period of 15 minutes. The resulting reaction mixture was stirred for an additional 30 minutes and filtered. The filter cake was washed with water and dried to give 29 grams of small white product crystals having a melting point of 168–171° C. These crystals were recrystallized from methanol to give 11 grams of white needles having a melting point of 176–180° C. On further recrystallization from ethyl acetate the purified product analyzed as follows:

|  | C | H | N |
|---|---|---|---|
| Calculated | 44.30 | 4.09 | 10.33 |
| Found | 46.02 | 4.42 | 10.67 |

EXAMPLE VIII

*Preparation of 2-(α-Bromoacetamido)-3-Phenylpropionamide* condenser, and thermometer were charged 21.4 grams of 93.5 percent pure 2-amino-3-phenyl propionamide (0.1 mole) and a solution of 45 grams of potassium carbonate in 120 milliliters of water and 80 milliliters of chloroform. To the resulting solution were added, with rapid stirring, 23.6 grams of bromoacetyl chloride (0.15 mole) at a temperature of 15–20° C., over a period of 10 minutes. The resulting reaction mixture was stirred for 15 minutes and filtered. The filter cake was washed with water and allowed to dry to give 25 grams of crude product having a melting point of 152–158° C. This product was twice recrystallized from hot ethanol to yield product needles having a melting point of 155–157.5° C. This product analyzed as follows:

|  | C | H | N |
|---|---|---|---|
| Calculated | 46.32 | 4.60 | 9.82 |
| Found | 46.21 | 4.81 | 9.63 |

EXAMPLE IX

*Preparation of 2-(N-Methyl-α-Bromoacetamido) Pentanoamide*

To a cooled solution of 45 grams of potassium carbonate in 120 milliliters of water and 80 milliliters of chloroform were added 16.7 grams of N-methylnorvalinamide hydrochloride (0.1 mole) at 10° C. To the resulting solution was added a solution of 23.6 grams of bromoacetyl chloride in 80 milliliters of chloroform, with stirring, over a period of 10–15 minutes at 10–15 ° C. The resulting reaction mixture was stirred for an additional 30 minutes and filtered. The filter cake was washed well with water and dried to give 5 grams of small white crystals which were recrystallized for ethyl acetate to give 4 grams of white product flakes having a melting point of 110–111° C. These product flakes analyzed as follows:

|  | C | H | N |
|---|---|---|---|
| Calculated | 38.26 | 6.02 | 11.16 |
| Found | 38.53 | 6.06 | 11.62 |

EXAMPLE X

*Preparation of 2-(α-Bromoacetamido)-3 Methylbutyric Acid*

To a cooled solution of 12.8 grams of sodium hydroxide in 120 milliliters water were added 11.7 grams (0.1 mole) of valine at 0° C. To the resulting solution were added 23.6 grams of bromoacetyl chloride, with stirring, at 0–5° C. over a period of 15 minutes. The resulting reaction product mixture was slurried with water and then filtered. The filter cake was washed with 200 milliliters of cold water and dried to give 15 grams of small white crystals which were recrystallized from water to give 12 grams of white product needles having a melting point of 148–150° C.

EXAMPLE XI

*Preparation of 2-(α-Bromoacetoxy)-3-Methylbutyramide*

To a cooled solution of 11.7 grams of α-hydroxyisovaleramide (0.1 mole) in 100 milliliters of dioxane were added 17 grams of bromoacetyl chloride while maintaining a solution temperature of about 10° C. The resulting mixture was stirred for 1.5 hours at 10–15° C. and then evaporated to 27 grams of product residue. The product residue was recrystallized from isopropyl ether to give 9 grams of crystalline product needles which were colorless and melted at 75–77° C. The product analyzed as follows:

|  | C | H | N |
|---|---|---|---|
| Calculated | 35.31 | 5.08 | 5.88 |
| Found | 36.65 | 5.27 | 6.08 |

EXAMPLE XII

*Preparation of 2-(α-Bromoacetoxy)-3-Phenylpropionamide*

16.5 grams of 2-hydroxy-3-phenylpropionamide were reacted with bromoacetyl chloride under conditions similar to those used above in Example XI. After purification, 12 grams of fluffy white needles were obtained and recrystallized from isopropyl ether to give fine needles having a melting point of 71–73° C. The product needles analyzed as follows:

|  | C | H | N |
|---|---|---|---|
| Calculated | 46.17 | 4.23 | 4.90 |
| Found | 47.96 | 4.73 | 4.68 |

EXAMPLE XIII

*Preparation of 2-(α-Bromoacetamido)- 3-Methylbutyronitrile*

To 10 grams of α-aminoisolvaleronitrile (0.1 mole) which had been cooled to 0° C. was added a solution of 8 grams of pyridine in 100 milliliters of isopropyl ether at 0–5° C. To the resulting solution were added 16 grams of bromoacetyl chloride, with stirring, at 0–5° C. over a period of 5 minutes. To the resulting emulsion were added 100 milliliters of water whereupon an organic layer separated. The organic layer was dried over sodium sulfate and then distilled under reduced pressure to leave 14 grams of a reddish-brown residue product.

EXAMPLE XIV

*Preparation of 2-(α-Bromoacetamido)- 3-Methylpentanonitrile*

To 11.2 grams of 2-amino 3-methylvaleronitrile which had been cooled to 0° C. was added a solution of 8 grams of pyridine in 100 milliliters of isopropyl ether at 0° C. To the resulting solution were added 16 grams of bromoacetyl chloride, with stirring, over a period of 5 minutes. The resulting reaction mixture was stirred for an additional 10 minutes and diluted with 100 milliliters of water. A resulting organic layer was washed with water and distilled under reduced pressure to leave 14 grams of a reddish-brown residue product.

EXAMPLE XV

*Preparation of N-Bromoacetyl-2,6-Dicyanopiperidine*

To a flask were charged 27 grams of (0.2 mole) of 2,6-dicyanopiperidine, followed by 300 milliliters of methylene chloride and 32 grams (0.2 mole) of bromoacetyl chloride. To the resulting solution were added with good stirring, 22.2 grams (0.22 mole) of triethylamine over a period of 3 to 4 minutes. The resulting reaction mixture was stirred for 2 hours and washed with an equal volume of water. An organic layer was separated and distilled under reduced pressure to 35° C. to leave 46 grams of brown solids. These solids were slurried in water, filtered, washed, and dried to give 40 grams of brown solids having a melting point of 95–103° C. These solids were twice recrystallized from 40 grams of isopropanol, to give 18 grams of tan product solids having a melting point of 110–112° C.

The following compounds, representative of those contemplated for use in this invention, were tested for activity against the fire blight organism, *Erwinia amylovora*.

Compound 1:
 2-(α-bromoacetamido)-3-methylbutyramide

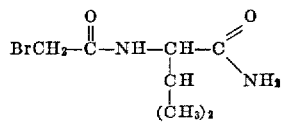

Compound 2: 2-(α-iodoacetamido)-3-methylbutyramide

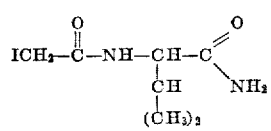

Compound 3: 2-(α-bromoacetamido)pentanoamide

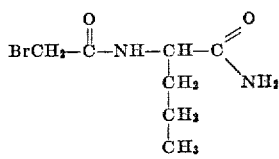

Compound 4:
 2-(α-bromoacetamido)-4-methylpentanoamide

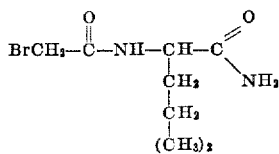

Compound 5: 2-(α-bromoacetamido)butyramide

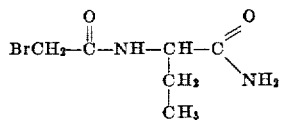

Compound 6:
 2-(α-bromoacetamido)-4-methylmercaptobutyramide

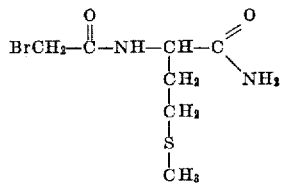

Compound 7: 2-(α-bromoacetamido)-2-phenylacetamide

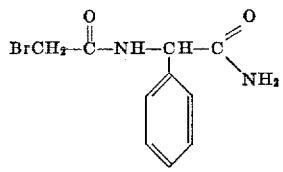

Compound 8:
 2-(α-bromoacetamido)-3-phenylpropionamide

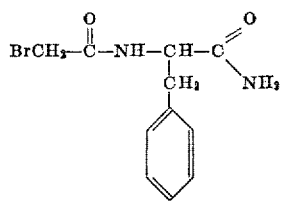

Compound 9:
 2-(N-methyl-α-bromoacetamido)pentanoamide

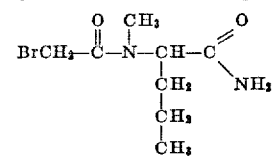

Compound 10:
 2-(α-bromoacetamido)-3-methylbutyric acid

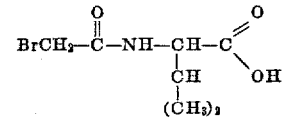

Compound 11: 2-(α-bromoacetoxy)-3-methylbutyramide

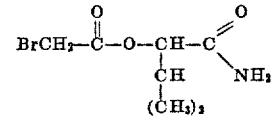

Compound 12:
2-(α-bromoacetoxy)-3-phenylpropionamide

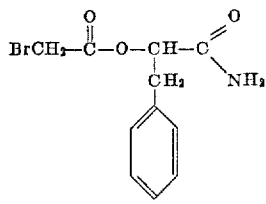

Compound 13:
2-(α-bromoacetamido)-3-methylbutyronitrile

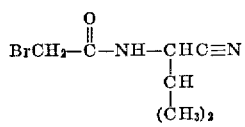

Compound 14:
2-(α-bromoacetamido)-3-methylpentanonitrile

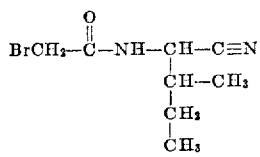

Compound 15: N-bromoacetyl-2,6-dicyanopiperidine

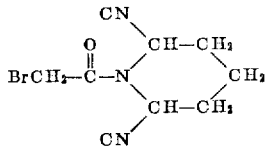

To ascertain that the bromoacetyl or iodoacetyl group is essential to the effectiveness of the compounds used in this invention, the following compounds were also evaluated with regard to their inhibitory effect on the fire blight organism.

Compound L:
2-(α-chloroacetamido)-3-methylbutyramide

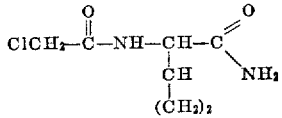

Compound M: 2-acetamido-3-methylbutyramide

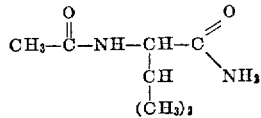

Compound N:
2-(α-bromopropionamido)-3-methylbutyramide

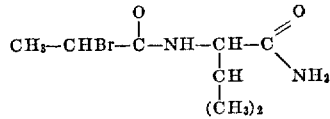

The compounds were tested for inhibition of growth of the bacteria, *Erwinia amylovora* (Burr.), in a sterile aqueous nutrient medium. One liter of said medium contained 30 grams of sucrose, 2 grams of L-glutamic acid, 1 gram of potassium phosphate, 0.5 gram of potassium chloride, 15 milligrams of iron versonol (17% $Fe_2O_3$), and 0.16 milligram of thiamine hydrochloride in water. The medium was adjusted to pH 6.9 and sterilized in 100 milliliter aliquots in 250 milliliter flasks. The aliquots in the flasks were inoculated with bacteria and a heavy, dense growth of bacteria in the culture medium was visually observed after twenty-four to forty-eight hours at 24° C. Aqueous solutions of the test compounds 1–15 and L, M, and N, were sterilized through a Millipore filter and aseptically added to the growth medium. The minimum concentrations of test compound in the final medium solution which prevented all growth of bacteria for twenty-four to forty-eight hours are given in Table I, below.

TABLE I

| Compound | Concentration of compound required to prevent all growth of bacteria[1] |
| --- | --- |
| 1 | 2.5 to 5 × 10⁻⁵ |
| 2 | 2.5 to 5 × 10⁻⁵ |
| 3 | 2.5 to 5 × 10⁻⁵ |
| 4 | 2.5 to 5 × 10⁻⁵ |
| 5 | 2.5 to 5 × 10⁻⁵ |
| 6 | 2.5 to 5 × 10⁻⁵ |
| 7 | 2.5 to 5 × 10⁻⁵ |
| 8 | 5 × 10⁻⁴ |
| 9 | 1 × 10⁻⁵ |
| 10 | 2.5 to 5 × 10⁻⁴ |
| 11 | 2.5 × 10⁻⁶ |
| 12 | 1 × 10⁻⁴ |
| 13 | 2.5 to 5 × 10⁻⁵ |
| 14 | 2.5 to 5 × 10⁻⁵ |
| 15 | 6 × 10⁻⁶ |
| L | >10⁻³ |
| M | >10⁻³ |
| N | >10⁻³ |

[1] In gram-moles of test compound per liter of final nutrient solution.

To evaluate the effectiveness of certain compounds when applied directly to bacteria-infested fruit trees, the following tests were carried out. Five-year-old Bartlett pear trees and Jonathan apple trees actively growing in the greenhouse were inoculated with *Erwinia amylovora* (Burr.) bacteria cells which had been harvested and resuspended in distilled water. The concentration of inoculum was such as to give 22 percent transmission on a spectrophotometer at 525μ. The bacteria suspension was sprayed on the trees to drip. The test compounds were dissolved in warm water to give aqueous solutions containing 500 parts of compound per million parts of solution, a small amount of sticker-spreader was added, and the solution was sprayed to cover a tree portion to drip. Three to four weeks after inoculation, the results were observed by counting the total number of limbs to which the compound had been applied and then counting the number of infected limbs. Results are expressed as percent infection, defined as $$100 \times \frac{\text{number of infected limbs}}{\text{total number of limbs treated}}$$

The results of these tests, observed 3–4 weeks after inoculation, are set forth in Table II, below.

TABLE II

| Compound | Test[1] | | | | |
| --- | --- | --- | --- | --- | --- |
| | Bartlett Pear | | | | Jonathan Apple— |
| | A | B | C | D | E |
| None (Control) | 75 | 26 | 28 | 58 | 17 |
| 1 | 25 | 0 | 5 | 0 | 0 |
| 9 | | 4 | 10 | 27 | 0 |
| 11 | | 0 | 5 | 24 | 0 |
| 12 | | | | 5 | 0 |
| 15 | | 0 | 23 | 30 | 6 |

[1] In tests A, B, and E, each test compound was applied 24 hours before inoculation with bacteria. In tests C and D each test compound was applied 24 hours after inoculation with bacteria.

To further test compound 1 under actual field conditions, Bartlett pear trees growing in the orchard were sprayed with compound 1 in aqueous solutions containing 250 p.p.m. and 1250 p.p.m., respectively. Twenty-four hours later, the trees were inoculated with bacteria as in the greenhouse tests. Examination of the trees 3 to 4 weeks after inoculation showed that, of the treated twigs, only one out of sixteen developed fire blight disease, whereas in an untreated control thirteen out of sixteen twigs developed the disease.

The above-described tests showed that the compounds of general Formula III above are the most preferred for application against fire blight and that compound 1, due to its outstanding performance under actual field conditions, is particularly preferred.

Compounds representative of those contemplated for use in this invention were also tested for activity against the causitive organism of bacterial spot, viz. *Xanthomonas pruni*. Two strains of bacteria, one from diseased peach trees in New Jersey, the other from diseased peach trees in Illinois, were used. The tests were carried out in an aqueous nutrient medium. One liter of said medium contained 30 grams of sucrose, 2 grams of L-glutamic acid, 1 gram of potassium phosphate, 0.5 gram of potassium chloride, 15 milligrams of iron versonol (17% $Fe_2O_3$), and 0.16 milligram of thiamine hydrochloride in water. The medium was adjusted to pH 6.9 and sterilized in 100 milliliter aliquots in 250 milliliter flasks. The aliquots in the flasks were inoculated with bacteria and a heavy, dense growth of bacteria in the culture medium was visually observed after twenty-four to forty-eight hours at 24° C. Aqueous solutions of the test compounds were sterilized through a Millipore filter and aseptically added to the growth medium. The minimum concentrations of test compound in the final medium solution which prevented all growth of bacteria for twenty-four to forty-eight hours are given in Table III, below.

TABLE III

| Compound | Organism [1] | Concentration of compound required to prevent all growth of bacteria [2] |
|---|---|---|
| 1 | A | $5 \times 10^{-5}$ |
|   | B | $2.5 \times 10^{-4}$ |
| 2 | A | $5 \times 10^{-4}$ |
|   | B | $2.5 \times 10^{-4}$ |
| 8 | A | $5 \times 10^{-5}$ |
|   | B | $5 \times 10^{-5}$ |
| 9 | A | $1 \times 10^{-4}$ |
|   | B | $1 \times 10^{-4}$ |
| 11 | A | $5 \times 10^{-6}$ |
|    | B | $5 \times 10^{-6}$ |
| 12 | A | $6 \times 10^{-6}$ |
|    | B | $6 \times 10^{-6}$ |
| 13 | A | $2.5 \times 10^{-4}$ |
|    | B | $1.3 \times 10^{-4}$ |
| 15 | A | $2.5 \times 10^{-4}$ |
|    | B | $1 \times 10^{-4}$ |

[1] Organism A was from diseased trees in New Jersey. Organism B was from diseased trees in Illinois.
[2] In gram-moles of test compound per liter of final nutrient solution.

It can be seen from Table III that the compounds of general Formula VI, above, exemplified by compounds 11 and 12 are particularly effective against the bacterial spot organism, and thus are preferred for this application.

In none of the above-described fire blight tests were phytotoxic effects observed in the concentrations used.

The compounds used in this invention can be applied as bactericidal compositions by the employment of either liquid or solid carriers. Since the compounds used in this invention are generally water-soluble, easily prepared water formulations are provided. Alternatively, the compounds can first be dissolved in a suitable organic solvent and the resulting organic solution then incorporated in water or any aqueous medium to produce a heterogeneous dispersion of the compound in water. Of course, surface active agents, sticker-spreader agents, and the like may be incorporated into such formulations as well-known by those skilled in the art.

Solid formulations, or dusts, can comprise, in addition to the active compound, carriers or extenders such as bentonite, attapulgite, talc, diatomaceous earth, and the like, and suitable dispersing agents.

The concentration of active compound to effect bactericidal action in these formulations can vary broadly and depends on the particular environment, type of tree to be treated, etc. Suitable formulations may contain, for example, from about 50 parts per million, or less, to about 5000 parts per million, or more, and more usually will contain from about 100 to about 1000 parts per million of active compound.

What is claimed is:

1. A method of controlling bacterial diseases of fruit trees which comprises applying to said trees a compound selected from the group of substituted amides having the formula

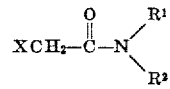

wherein X is selected from the group consisting of bromine and iodine; $R^1$ individually is selected from the group consisting of hydrogen and alkyl of from 1 to about 4 carbon atoms; $R^2$ individually is selected from the group consisting of carboxamido substituted alkyl radicals, cyano substituted alkyl radicals, and carboxy substituted alkyl radicals, and where said alkyl radicals may further be substituted with a member of the group consisting of alkylthio and aryl; and $R^1$ and $R^2$ taken together with the nitrogen atom to which they are attached represent a heterocyclic ring of from 2 to 6 carbon atoms, said ring being substituted on at least one of the carbon atoms adjacent to said nitrogen atom with a member of the group consisting of carboxamido, cyano, and carboxy.

2. A method of controlling bacterial diseases of fruit trees which comprises applying to said trees a compound selected from the group of substituted esters having the formula

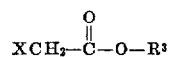

wherein X is selected from the group consisting of bromine and iodine; and $R^3$ is selected from the group consisting of carboxamido substituted alkyl radicals, cyano substituted alkyl radicals, and carboxy substituted alkyl radicals, and where said alkyl radicals may further be substituted with a member of the group consisting of alkylthio and aryl.

3. A method of controlling bacterial diseases of fruit trees which comprises applying to said trees a compound selected from the group consisting of compounds of the following generic formulae:

(1) 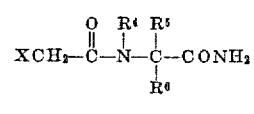

(2) 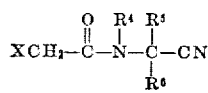

(3) 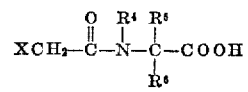

(4) 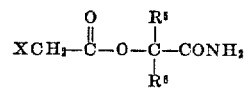

(5) 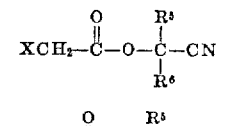

(6)
$$XCH_2-\overset{O}{\overset{\|}{C}}-O-\overset{R^5}{\underset{R^6}{\overset{|}{C}}}-COOH$$

(7) 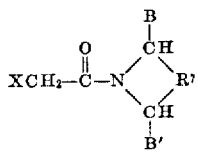

where X is selected from the group consisting of bromine and iodine; $R^4$ and $R^5$ individually are selected from the group consisting of hydrogen and akyl of from 1 to 4 carbon atoms; $R^6$ is selected from the group consisting of alkyl of from 1 to about 8 carbon atoms, alkylthioalkyl of from 2 to about 5 carbon atoms; aryl; and aralkyl of from 7 to about 13 carbon atoms; $R^7$ is selected from the group consisting of a single bond and an alkylene radical of from 2 to about 6 carbon atoms; B is selected from the group consisting of carboxamido, cyano, and carboxy, and B' is selected from the group consisting of hydrogen, carboxamido, cyano, and carboxy.

4. The method for controlling the fire blight disease of fruit trees which comprise applying to said trees a compound of the formula

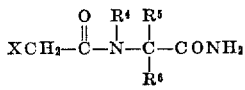

where X is selected from the group consisting of bromine and iodine; $R^4$ and $R^5$ individually are selected from the group consisting of hydrogen and alkyl of from 1 to 4 carbon atoms; $R^6$ is selected from the group consisting of alkyl of from 1 to about 8 carbon atoms, alkylthioalkyl of from 2 to about 5 carbon atoms; aryl; and aralkyl of from 7 to about 13 carbon atoms.

5. The method for controlling the bacterial spot disease of fruit trees which comprises applying to said trees a compound of the formula

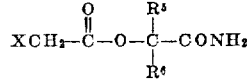

where X is selected from the group consisting of bromine and iodine; $R^5$ is selected from the group consisting of hydrogen and alkyl of from 1 to 4 carbon atoms, and $R^6$ is selected from the group consisting of alkyl of from 1 to about 8 carbon atoms, alkylthioalkyl of from 2 to about 5 carbon atoms; aryl; and aralkyl of from 7 to about 13 carbon atoms.

6. The method of controlling the fire blight disease of fruit trees which comprises applying to said trees 2-(α-bromoacetamido)-3-methylbutyramide.

7. The method of controlling the bacterial spot disease of fruit trees which comprises applying to said trees 2-(α-bromoacetoxy)-3-methylbutyramide.

References Cited in the file of this patent

Weaver et al.: Journal Americal Chemical Society, vol. 69, pages 515 to 516, 1947.

UNITED STATES PATENT OFFICE
CERTIFICATE OF CORRECTION

Patent No. 3,102,068                          August 27, 1963

Nathan E. Tolbert

It is hereby certified that error appears in the above numbered patent requiring correction and that the said Letters Patent should read as corrected below.

Column 5, lines 5 to 10, the reaction scheme should appear as shown below instead of as in the patent:

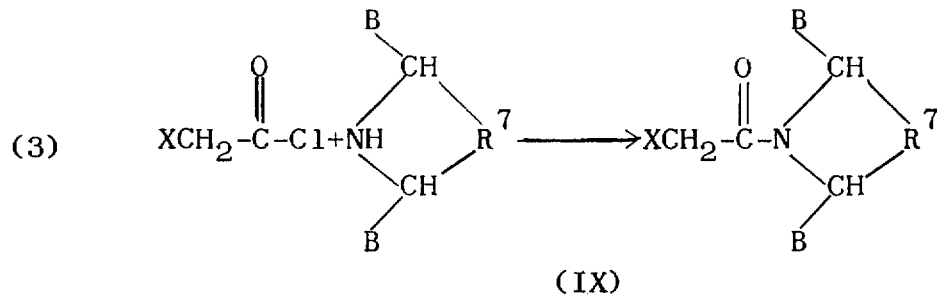

Signed and sealed this 5th day of May 1964.

(SEAL)
Attest:

ERNEST W. SWIDER                              EDWARD J. BRENNER
Attesting Officer                               Commissioner of Patents